United States Patent
Yamaguchi et al.

(10) Patent No.: US 8,509,127 B2
(45) Date of Patent: Aug. 13, 2013

(54) MANAGEMENT DEVICE, OUTPUT DEVICE, METHOD AND COMPUTER READABLE MEDIUM

(75) Inventors: Kensaku Yamaguchi, Yokohama (JP); Shinya Murai, Kawasaki (JP); Masataka Goto, Yokohama (JP); Yasuyuki Nishibayashi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1048 days.

(21) Appl. No.: 11/711,129

(22) Filed: Feb. 27, 2007

(65) Prior Publication Data
US 2007/0274243 A1 Nov. 29, 2007

(30) Foreign Application Priority Data
Mar. 30, 2006 (JP) ................................. 2006-095246

(51) Int. Cl.
*H04B 7/00* (2006.01)
(52) U.S. Cl.
USPC ....................................... 370/310; 370/310.2
(58) Field of Classification Search
USPC ...... 370/310, 338, 328; 455/67.11, 418–420, 455/500, 507, 517, 41.1–41.3, 456.1–456.3, 455/556.1, 557; 345/156, 168
See application file for complete search history.

(56) References Cited

U.S. PATENT DOCUMENTS

| | | | |
|---|---|---|---|
| 6,163,270 A * | 12/2000 | Silverman | 340/3.3 |
| 6,675,240 B1 * | 1/2004 | Ludtke | 710/62 |
| 6,784,855 B2 | 8/2004 | Matthews et al. | |
| 6,839,781 B1 * | 1/2005 | Kanazawa | 710/67 |
| 6,892,151 B1 * | 5/2005 | Giorgetta et al. | 702/71 |
| 6,947,975 B2 * | 9/2005 | Wong et al. | 709/217 |
| 7,203,526 B2 * | 4/2007 | Frank | 455/574 |
| 7,509,131 B2 | 3/2009 | Krumm et al. | |
| 7,522,929 B2 * | 4/2009 | Hashizume | 455/517 |
| 7,664,081 B2 * | 2/2010 | Luoma et al. | 370/338 |
| 7,702,775 B2 * | 4/2010 | Kuan et al. | 709/224 |
| 2002/0052182 A1 * | 5/2002 | Mayuzumi | 455/41 |
| 2002/0065045 A1 * | 5/2002 | Kim | 455/41 |
| 2004/0137855 A1 * | 7/2004 | Wiley et al. | 455/88 |
| 2004/0233168 A1 * | 11/2004 | Christenson | 345/163 |
| 2005/0138138 A1 * | 6/2005 | Jelinek et al. | 709/217 |
| 2006/0012828 A1 * | 1/2006 | Ohta | 358/1.18 |
| 2007/0005693 A1 * | 1/2007 | Sampath et al. | 709/204 |
| 2009/0077192 A1 * | 3/2009 | Nishibayashi et al. | 709/207 |

FOREIGN PATENT DOCUMENTS

| | | |
|---|---|---|
| JP | 2002-304283 | 10/2002 |
| JP | 2006-010687 | 1/2006 |
| WO | 2005/121959 | 12/2005 |

OTHER PUBLICATIONS

Office Action dated Jul. 16, 20010 in Japanese Application No. 2006-095246 and English-language translation.
Office Action dated Jan. 21, 2011 in Japanese Application No. 2006-095246, and English-language translation.

* cited by examiner

*Primary Examiner* — Brandon Miller
(74) *Attorney, Agent, or Firm* — Nixon & Vanderhye, P.C.

(57) ABSTRACT

There is provided with a management device including: a communication unit configured to receive input function information indicating input functions provided by input devices through a wireless network and receive reception level information indicating reception levels of signals which an output device connected to the wireless network has received from the input devices from the output device; and a determiner configured to determine an input device to be combined with the output device based on the input function information and the reception level information.

25 Claims, 11 Drawing Sheets

| IDENTIFIER | FUNCTION |
|---|---|
| 00:00:39:00:00:02 | CHARACTER INPUT FUNCTION |

FIG. 4

| IDENTIFIER | FUNCTION | STATUS |
|---|---|---|
| 00:00:39:00:00:02 | CHARACTER INPUT FUNCTION | ON STANDBY |
| 00:00:39:00:00:03 | POINTER INPUT FUNCTION | ON STANDBY |
| 00:00:39:00:00:06 | CHARACTER INPUT FUNCTION | ON STANDBY |
| 00:00:39:00:00:07 | POINTER INPUT FUNCTION | ON STANDBY |
| 00:00:39:00:00:10 | DISPLAY FUNCTION | ON STANDBY |

FIG. 5

| IDENTIFIER | SIGNAL INTENSITY (%) |
|---|---|
| 00:00:39:00:00:01 | 50 |
| 00:00:39:00:00:02 | 45 |
| 00:00:39:00:00:03 | 40 |
| 00:00:39:00:00:04 | 35 |
| 00:00:39:00:00:05 | 15 |
| 00:00:39:00:00:06 | 10 |

FIG. 6

| IDENTIFIER | SIGNAL INTENSITY (%) | FUNCTION | STATUS |
|---|---|---|---|
| 00:00:39:00:00:02 | 45 | CHARACTER INPUT FUNCTION | ON STANDBY |
| 00:00:39:00:00:03 | 40 | POINTER INPUT FUNCTION | ON STANDBY |
| 00:00:39:00:00:06 | 10 | CHARACTER INPUT FUNCTION | ON STANDBY |

FIG. 7

| DISPLAY DEVICE | INPUT DEVICES TO BE COMBINED |
|---|---|
| 00:00:39:00:00:10 | 00:00:39:00:00:02, 00:00:39:00:00:03 |
| 00:00:39:00:00:11 | 00:00:39:00:00:06 |
| 00:00:39:00:00:12 | 00:00:39:00:00:07 |

FIG. 8

MANAGEMENT DEVICE, OUTPUT DEVICE, METHOD AND COMPUTER READABLE MEDIUM

CROSS-REFERENCE TO RELATED APPLICATIONS

This application is based upon and claims the benefit of priority from prior Japanese Patent Application No. 2006-95246 filed on Mar. 30, 2006, the entire contents of which are incorporated herein by reference.

BACKGROUND OF THE INVENTION

1. Field of the Invention

The present invention relates to a management device, an output device, a device management method and a computer readable medium.

2. Related Art

JP-A 2002-304283 (Kokai) proposes a display device with portability which allows an ability of a user interface of a computer to be carried on and used.

The display device shown in this document has a function of receiving image information through a wireless communication channel from a host computer located at a fixed position and displaying the image information on a display unit. Furthermore, this display device is furnished with a user input device for touch input such as a pen which also allows the user to perform input operation. Combining these two functions allows the user to use an application program on the host computer. That is, this display device provides means for using the user interface of the host computer at a fixed position remotely while providing portability.

The same document also explains a device called a "docking station" to accommodate a display device to house the display device. The docking station is installed at a fixed position and communicates with the host computer through wire connection. The docking station is connected to user input devices such as a mouse and keyboard.

The display device operates in two modes; a mode accommodated in the docking station ("dependent mode") and a mode not accommodated in the docking station ("independent mode").

In the "independent mode", the display device communicates with the host computer through the wireless communication channel and is used as a portable user interface device.

On the other hand, in the "dependent mode", the display device is fixed to the docking station and thereby temporarily loses the characteristic of portability. Instead, the display device can provide high quality image display through the wire connection and can also charge a battery by receiving a power supply from the docking station. Moreover, because the fixed keyboard and mouse are available, it is assumed that the user may preferably use the keyboard and mouse rather than touch input using a pen.

In the above configuration, it is only when the display device is operating in a "dependent mode" that the display device can be used in combination with the keyboard and the mouse. That is, to use the keyboard and mouse, the user needs to carry the display device and move to the location of the docking station and use the computer at that location.

However, even if the display device has the touch input function using a pen, this is inconvenient for a large amount of input and even in a place where there is no docking station, there can be situations in which it is more desirable if the keyboard and the mouse could be used. For example, when the user wants to input minutes to a file on the host computer through the display device in a meeting room where there is no docking station, it is inconvenient that the keyboard cannot be used.

When attempting to make a keyboard and mouse available in a place where there is no docking station, since the keyboard and mouse are devices independent of the display device, it is necessary to provide means for transmitting the result of the input operation to the host computer.

Specifically, one possible method is to connect these input devices such as a conventional keyboard and mouse to the display device through wire connection. This method is apparently simple and provides reliable operation but it cuts in half the advantages of portability and wireless feature. Moreover, the display device needs to be provided with a connector for wire connection, which increases the weight. The display device must convert a signal from the input device to a wireless channel signal and moreover it also needs to deal with a case where an input device which has a similar function as the mouse and yet has a characteristic different from the mouse such as a trackball and tablet is connected instead of the mouse, and therefore the display device needs to have the ability beyond that of a simple display device.

Using a wireless keyboard and wireless mouse compatible with wireless communication, which is becoming widespread in recent years, can avoid some of the disadvantages of the above described scheme. However, in the case of wireless LAN, the wireless channel used when the display device communicates with the host computer is more likely to be in an infrastructure mode via an access point, while most of wireless keyboards and wireless mice currently in use are designed to directly communicate with the destination (display device in this case), and therefore the display device must be equipped with two or more wireless communication units. Moreover, the problem that the display device must support various types of input devices still remains unsolved.

One mode of avoiding constraints of these existing input devices may be to introduce an input device (hereinafter, referred to as "wireless LAN compatible input device") equipped with a mechanism for carrying out a wireless communication with the host computer in much the same way as a wireless display. The wireless LAN compatible input device transmits, for example, input character information in the case of a keyboard or movement information of a pointer in the case of a mouse to the host computer through a wireless communication. The host computer receives this input information and applies it as the input to an application program to be displayed on the display device. By so doing, the display device side has no necessity to be provided with a mechanism corresponding to the input device.

When attempting to exploit the characteristic of portability of the display device to the fullest, it is desirable not to fix the correspondence between the display device and wireless LAN compatible input device. Furthermore, it is preferable to select a wireless LAN compatible input device which is near a display device every time the display device is used and use it in combination with the display device.

However, when a wireless LAN is used as the wireless communication unit, the reach of the wireless LAN is long and can also be extended using a wired LAN, and therefore there may be many wireless LAN compatible input devices on the same LAN. In order to determine which of these input devices should be used in combination with the display device, if all wireless LAN compatible input devices are displayed in the form of a list so as to allow the user to select one, the level of user convenience is low because the input function necessary for the display device is limited while there are many alternatives of the input devices.

SUMMARY OF THE INVENTION

According to an aspect of the present invention, there is provided with a management device comprising:
a communication unit configured to receive input function information indicating input functions provided by input devices through a wireless network and receive reception level information indicating reception levels of signals which an output device connected to the wireless network has received from the input devices from the output device; and
a determiner configured to determine an input device to be combined with the output device based on the input function information and the reception level information.

According to an aspect of the present invention, there is provided with a device management method comprising:
receiving input function information indicating input functions provided by input devices through a wireless network;
receiving reception level information indicating reception levels of signals which an output device connected to the wireless network has received from the input devices from the output device; and
determining an input device to be combined with the output device based on the input function information and the reception level information.

According to an aspect of the present invention, there is provided with an output device comprising:
a measurement unit configured to measure reception levels of signals received from input devices connected to a wireless network;
a transmission unit configured to transmit information indicating the reception levels of the input devices to a management device connected to the wireless network;
a reception unit configured to receive processing information from the management device through the wireless network, the processing information being generated based on an input signal transmitted from an input device out of the input devices to the management device; and
an output unit configured to output the processing information received by the reception unit.

According to an aspect of the present invention, there is provided with a computer readable medium storing a computer program for causing a computer to execute instructions to perform steps of:
receiving input function information indicating input functions provided by input devices through a wireless network;
receiving reception level information indicating reception levels of signals which an output device connected to the wireless network has received from the input devices from the output device; and
determining an input device to be combined with the output device based on the input function information and the reception level information.

BRIEF DESCRIPTION OF THE DRAWINGS

FIG. 4 illustrates an example of an identifier of a wireless LAN compatible input device or the like and the function provided by the device;
FIG. 5 illustrates an example of identifiers of a wireless LAN compatible input device or the like and the functions provided and statuses;
FIG. 6 illustrates an example of signal intensity and identifier of a wireless LAN device;
FIG. 7 illustrates an example of a list in which identifiers or the like of wireless LAN compatible input devices are arranged in descending order of signal intensity;
FIG. 8 illustrates an example of combination of wireless LAN compatible input devices;
FIG. 9 is a flow chart showing the flow of processing executed when the power of a wireless LAN compatible input device and display device is turned on.

DETAILED DESCRIPTION OF THE INVENTION

First Embodiment

Figure 1:
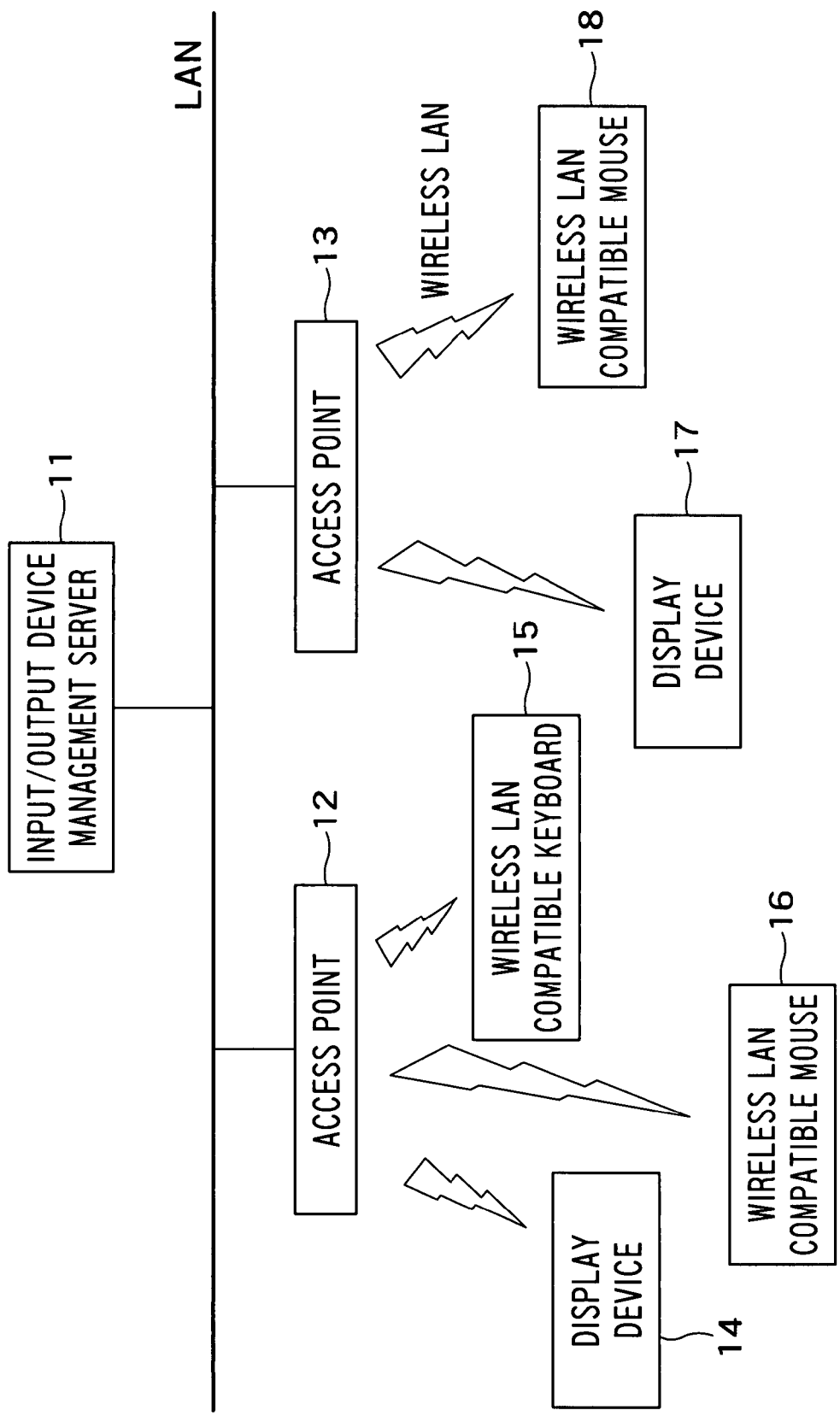
FIG. 1 is a block diagram showing a system according to this embodiment.

FIG. 1 is a block diagram showing the overall system according to this embodiment.

An input/output device management server (management device) 11 is installed to determine a wireless LAN compatible input device (input device) to be combined with a display device (output device).

The management server 11 is connected to a LAN (Local Area Network) and wireless LAN access points 12, 13 are connected to this LAN.

A display device 14 and a wireless LAN compatible input device such as a wireless LAN compatible keyboard 15 and a wireless LAN compatible mouse 16 can communicate with the management server 11 via the wireless LAN access point 12. A display device 17 and a wireless LAN compatible input device such as a wireless LAN compatible mouse 18 can communicate with the management server 11 via the wireless LAN access point 13.

Figure 2:
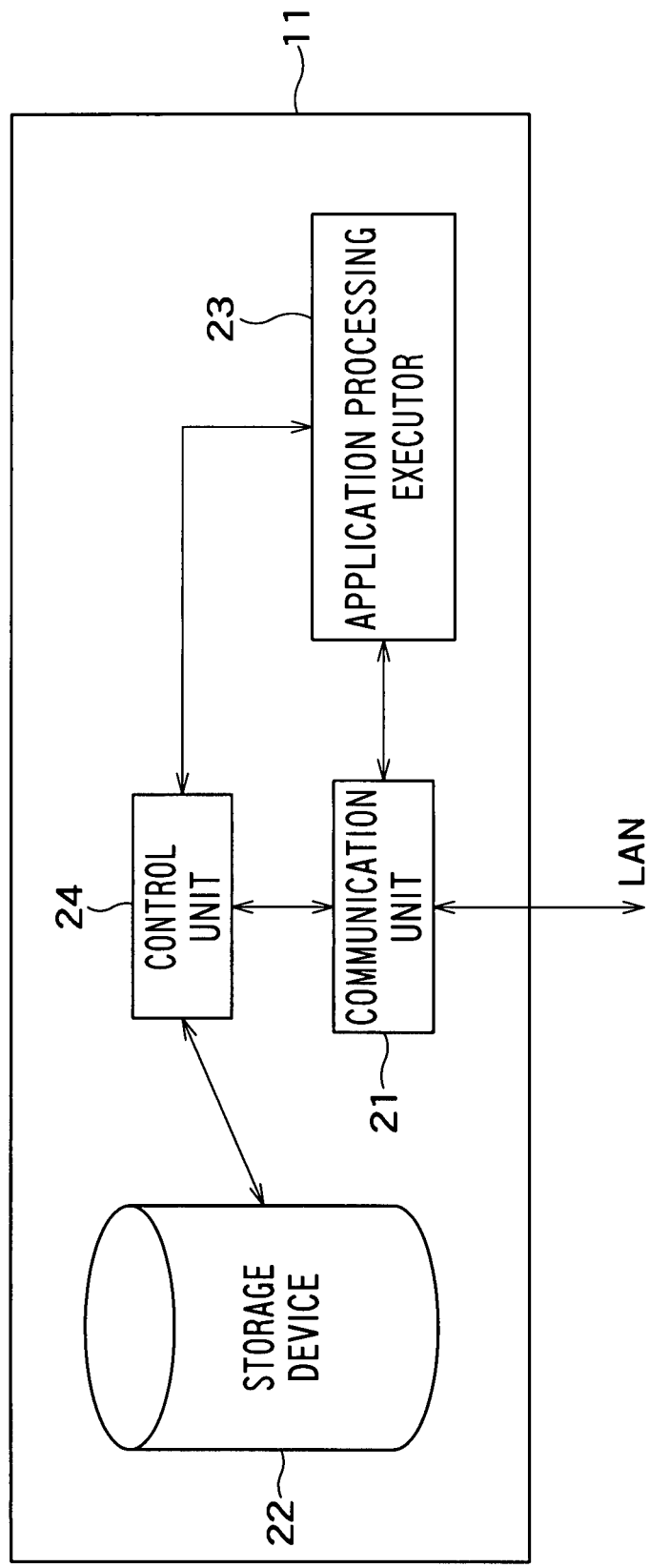
FIG. 2 is a block diagram showing an input/output device management server.

FIG. 2 is a block diagram showing the configuration of the management server 11.

Figure 10:
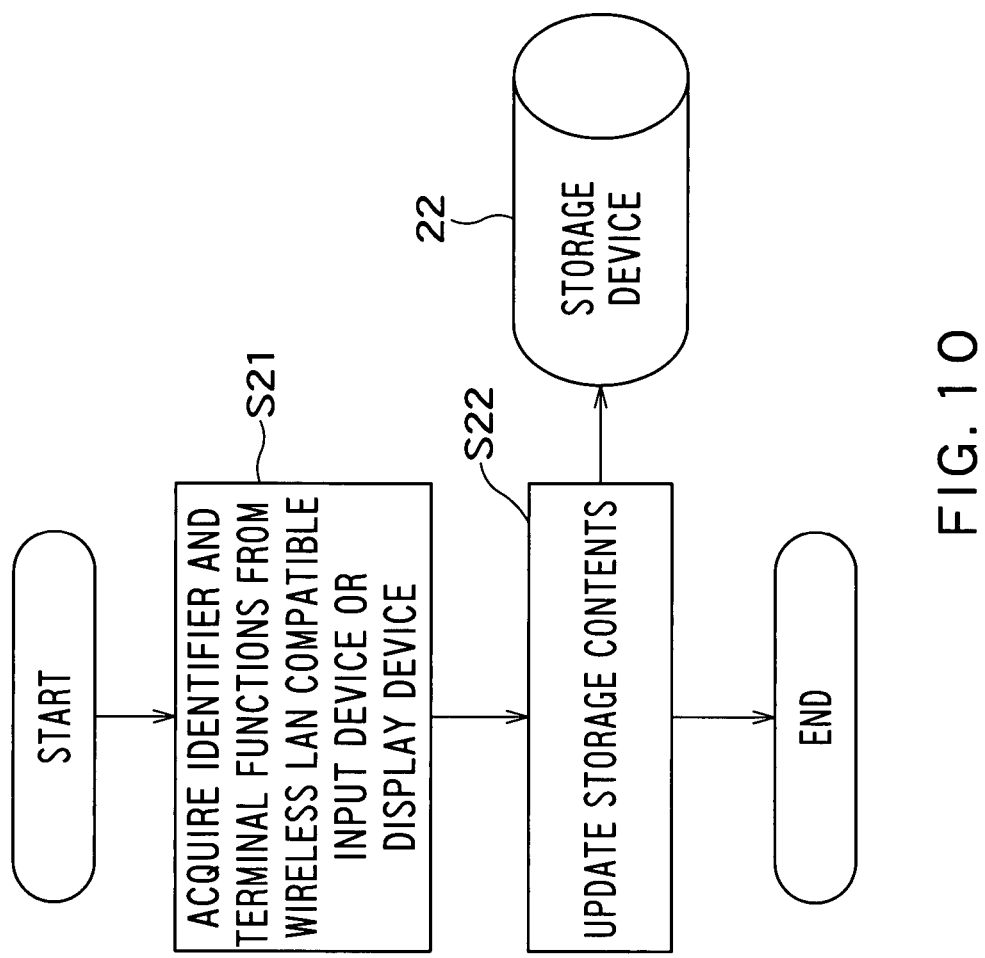
FIG. 10 is a flow chart showing the flow of processing executed when the input/output device management server receives the information in FIG. 9.
Figure 12:
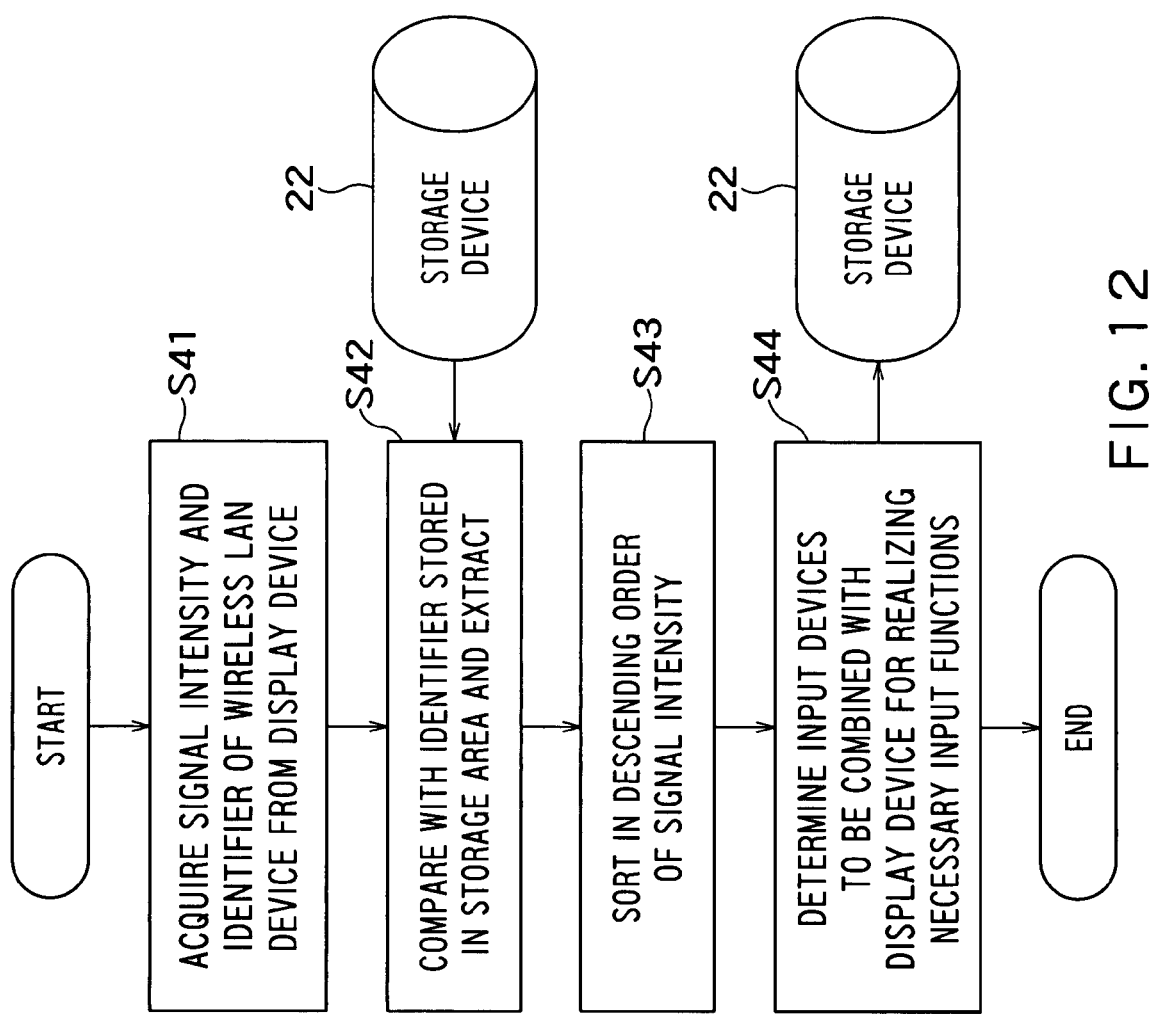
FIG. 12 is a flow chart showing the flow of processing executed when the input/output device management server is informed of the signal intensity and identifier of each device.
Figure 13:
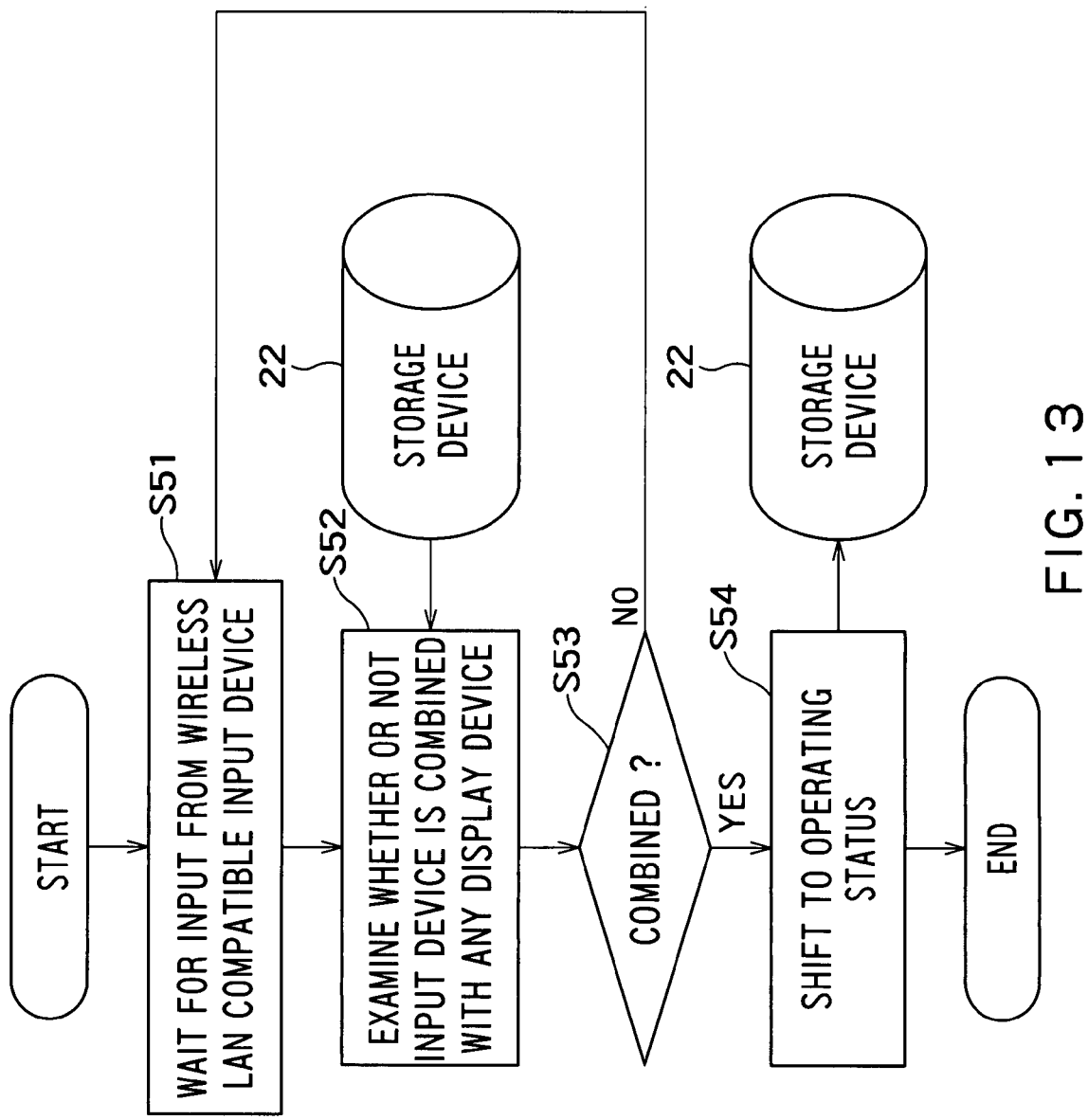
FIG. 13 is a flow chart showing the flow of processing executed when the input/output device management server receives an input signal from a wireless LAN compatible input device on standby.

The management server 11 is provided with a communication unit 21 which carries out a LAN communication, a storage device 22 which stores the respective statuses of the wireless LAN compatible input devices and display devices and the information on the wireless LAN compatible input devices combined with each display device, an application processing executor 23 which executes an application program to be displayed on the display device, and a control unit 24 which controls the communication unit 21, storage device 22 and application processing executor 23 and executes various types of processing which will be described later (for example, processing shown in FIG. 10, FIG. 12, FIG. 13). The control unit 24 includes, for example, a determiner, an instruction signal generating unit. The application processing executor 23 receives an operation signal inputted by a wireless LAN compatible input device through the communication unit 21 and inputs the received operation signal to the application program. It then transmits the execution result of the application program to the display device combined with the wireless LAN compatible input device through the communication unit 21. The role of the application processing executor may also be played by a host computer separately provided on the LAN.

Figure 3:
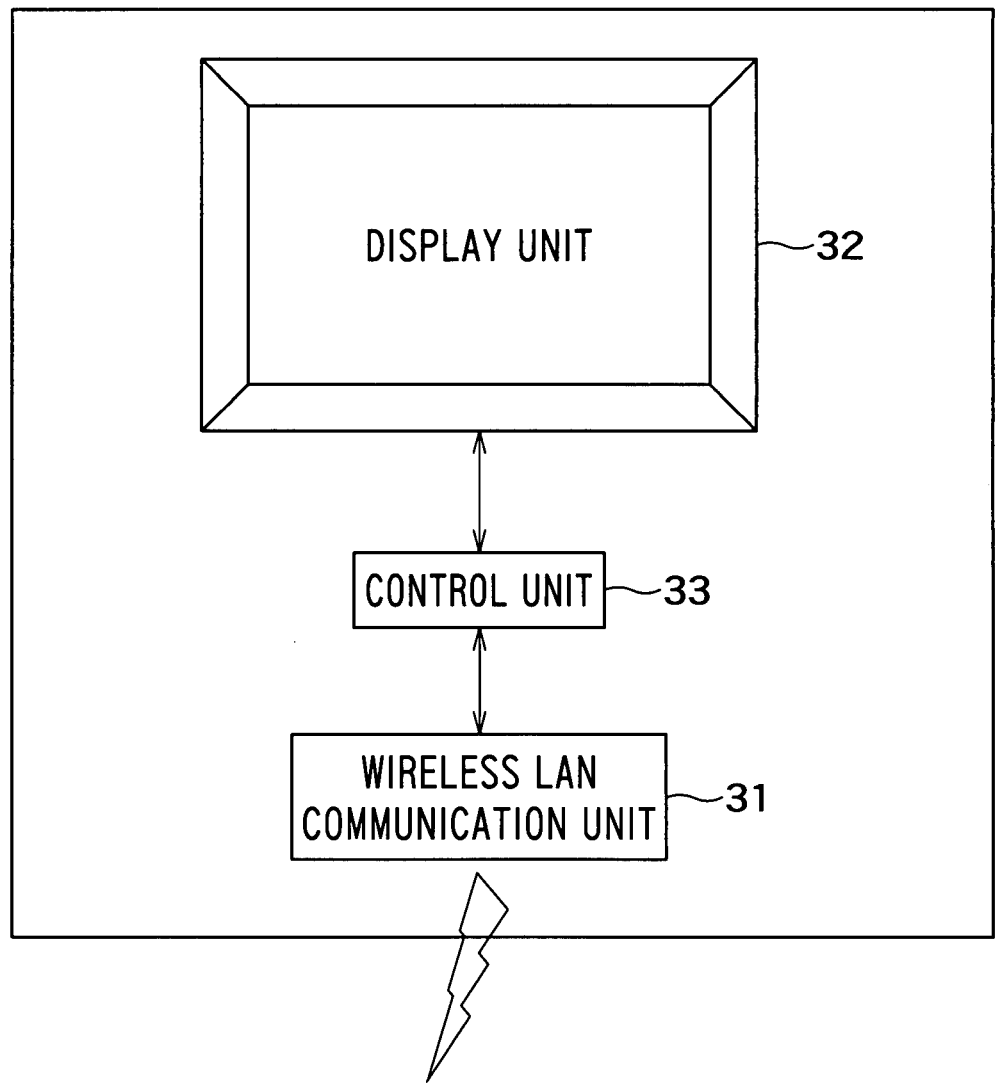
FIG. 3 is a block diagram showing a display device.

FIG. 3 is a block diagram showing the configuration of the display device.

The display device is provided with a wireless LAN communication unit 31 which carries out a wireless LAN communication, a display unit 32 which displays image information and a control unit 33 which controls the wireless LAN communication unit 31 and display unit 32 and executes various types of processing (for example, processing shown in FIG. 9, FIG. 11) which will be described later. The control unit 33 includes, for example, a measurement unit.

Figure 9:
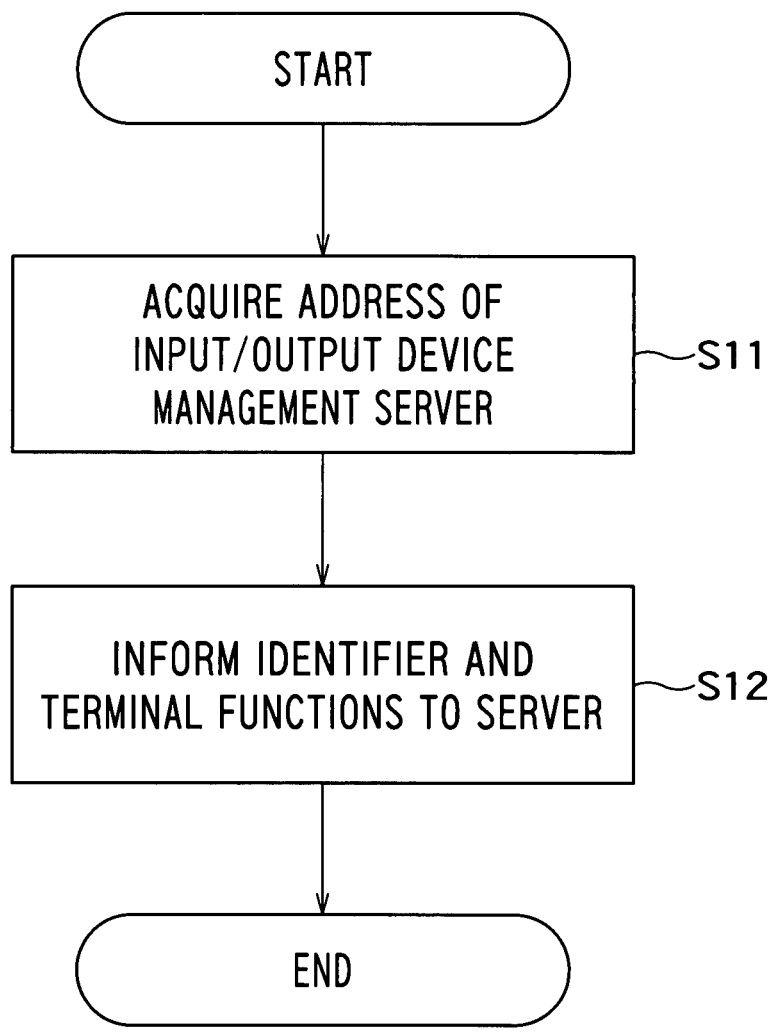

FIG. 9 is a flow chart showing the flow of processing which is executed at the wireless LAN compatible input device and the display device when the power of the wireless LAN compatible input device and the display device is turned on.

The wireless LAN compatible input device acquires, when the power thereof is turned on, the address of the management server 11 by means for receiving information from a DHCP server (S11) and informs the own identifier (e.g., MAC address) and functions provided by itself (character input function, pointer input function or the like) to the management server 11 (S12). For example, it notifies such information as shown in FIG. 4.

As with the wireless LAN compatible input device, the display device also acquires the address (S11) of the management server 11 by means of receiving information from the DHCP server and informs the own identifier (e.g., MAC address) and the functions provided by itself (display function or the like) to the management server 11 (S12).

FIG. 10 is a flow chart showing the flow of processing executed by the management server 11 when it receives information on the identifier and the function provided from the wireless LAN compatible input device and the display device.

Upon receiving the information on the identifier and the function provided from the wireless LAN compatible input device and the display device (S21), the management server 11 stores the received information in the storage device 22 (S22). In addition, the management server 11 also stores the statuses of each wireless LAN compatible input device and the display device. Each device is on standby in the initial status. FIG. 5 shows an example of information stored in the storage device 22.

Figure 11:
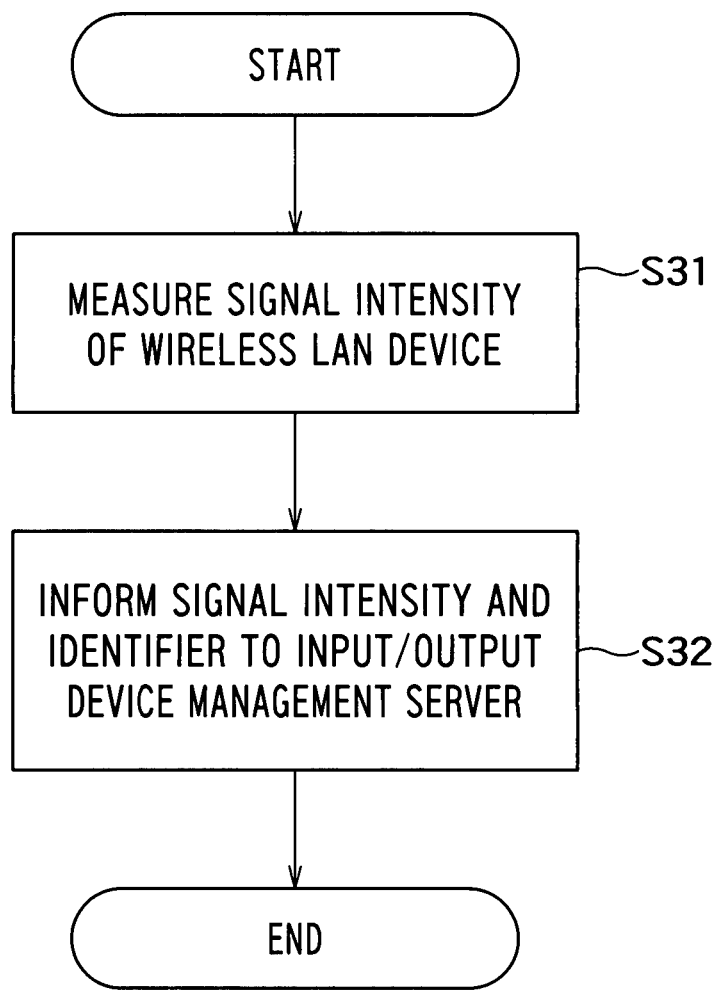
FIG. 11 is a flow chart showing the flow of processing executed when the display device is on standby.

FIG. 11 is a flow chart showing the flow of processing executed by the display when it is on standby.

The display device on standby periodically measures the reception levels (e.g., signal intensity) of all wireless LAN devices (not necessarily limited to wireless LAN compatible input devices) located nearby when it is on standby (S31). In the case where a plurality of wireless LAN channels exist, measurement is performed by sequentially switching between the respective channels. The wireless LAN compatible input device side may also perform measurement in a similar manner. The display device informs the information on the signal intensity measured and the identifier of each wireless LAN device (e.g., MAC address) to the management server 11 (S32). Processing from above S31 to S32 will be repeated periodically.

FIG. 12 is a flow chart showing the flow of processing executed by the management server 11 when it is informed of the signal intensity and the identifier of each wireless LAN device from the display device.

Upon receiving the information on the signal intensity and the identifier of each wireless LAN device from the display device, the management server 11 stores the signal intensity and the identifier of each wireless LAN device in the storage device 22 (S41). FIG. 6 shows an example of the information stored in the storage device 22.

The management server 11 compares the information on the identifier and signal intensity informed from the display device with the previously stored identifier (see FIG. 5) of the wireless LAN compatible input device and extracts information that matches the previously stored identifier of the wireless LAN compatible input device from the information on the identifier and signal intensity informed from the display device (S42). A list is created by sorting the extracted identifiers and signal intensities in descending order of signal intensity and adding the functions provided by the wireless LAN compatible input device and their statuses to those identifiers and signal intensities (S43). FIG. 7 shows an example of the list created.

According to the list created, it is assumed that a wireless LAN compatible input device having strong signal intensity has a relatively small distance from the display device compared to one having weak signal intensity. When signal intensity has been measured at a wireless LAN compatible input device side, it is also possible to estimate a distance from the display device to the wireless LAN compatible input device by using the information on the signal intensity. When there are wireless LAN compatible input devices which are not on standby but in use, these may be excluded from this list.

The management server 11 selects one or more wireless LAN compatible input devices which have the necessary input functions in ascending order of distance from the display device from among the wireless LAN compatible input devices in the list and determines the configuration which realizes the necessary input functions (S44). For example, a configuration which combines each display device 14, 17 with one keyboard and one mouse is created. In this case, an input device included in the configuration of the other display device may be excluded from the selection. The input functions necessary for the display device may be registered beforehand for each display device or such functions may be informed from the display device. When there are a plurality of input functions necessary for the display device and only one of wireless LAN compatible input devices corresponding to the plurality of input functions exists, only this wireless LAN compatible input device is combined with the display device for the time being. When wireless LAN compatible input devices which have the remaining input functions are detected later, they may be added as will be described in the following paragraph or according to a fourth embodiment. The management server 11 creates the set of wireless LAN compatible input devices and then stores the information indicating the set in the storage device 22. FIG. 8 shows an example of this information.

If there is no more input operation from a user even after the set of the display device and wireless LAN compatible input devices is determined, the display device and wireless LAN compatible input devices are on standby. When they are on standby, if there is a change in signal intensity or when a wireless LAN compatible input device is newly detected, it is possible to change the wireless LAN compatible input devices to be combined with the display device.

FIG. 13 is a flow chart showing the flow of processing executed by the management server 11 when a signal input occurs from a wireless LAN compatible input device on standby.

The management server 11 waits for a signal input from the wireless LAN compatible input device on standby (S51). When there is an input to the wireless LAN compatible input device on standby from the user, the wireless LAN compatible input device informs the input signal to the management server. The management server examines whether or not the wireless LAN compatible input device is combined with any display device with reference to the storage device 22 (S52). When not combined (No in S53), the management server ignores the input signal and returns to the standby status. When combined (Yes in S53), the display device combined with the wireless LAN compatible input device and all wireless LAN compatible input devices combined with the display device are shifted from the standby status to the operating status (S54). A signal inputted from a wireless LAN compatible input device in the operating status is transferred to the application processing executor 23 and is used as the signal to operate the application to be displayed on the display device combined with the wireless LAN compatible input device.

When the user stops using the application program (due to log-out operation or the like), the display device and each wireless LAN input device return to the standby status.

As described above, this embodiment measures signal intensities of wireless LAN devices which exist around a display device, estimates a wireless LAN compatible input device at the shortest distance from the display device based on the measurement results and combines the estimated wireless LAN compatible input device and the display device, and therefore the user can use a nearby wireless LAN compatible input device every time the user uses the display device according to need.

Second Embodiment

As for the operation of the management server 11 in the first embodiment, in the case where there are a plurality of wireless LAN compatible input devices which are judged from their signal intensities to be located at same distances more or less from a display device, a user may be asked to select a wireless LAN compatible input device to be used from among those wireless LAN compatible input devices.

For example, when some wireless LAN compatible input devices are near the display device, images such as their respective outlines and manufacturer logos may be displayed on the display device and operation necessary to select a wireless LAN compatible input device may also be displayed. Examples of operation include pressing a key if it is a keyboard or pressing a button if it is a mouse or moving a pointer so that it shows a certain track. When the user performs operation for selecting the wireless LAN compatible input device to be used, the device is selected and associated with the display device.

Third Embodiment

The management server 11 periodically instructs wireless LAN compatible input devices on standby to temporarily change over to certain wireless LAN channel, set radio wave intensity (transmission level) to be outputted to a specified value (a value weaker than usual) to transmit a wireless LAN frame for measurement. At the same time, the management server 11 also instructs the display device to attempt to receive the channel and report signal intensity of received each frame.

A wireless LAN compatible input device, the output frame of which can be received by the display device even when the radio wave intensity is weak is assumed to have a small distance from the display device. Furthermore, signal intensity obtained in the embodiment reflects the magnitude correlation of distances between the input devices and display device more accurately than signal intensity of signals received from the input devices at time of normal operation.

Moreover, in the case of a network for which a plurality of wireless LAN channels are used, the scheme according to the first embodiment requires the display device to switch between a plurality of wireless LAN channels to perform measurement, whereas the scheme of this embodiment has an effect of reducing load on the display device because measurement is performed through only one wireless LAN channel.

Fourth Embodiment

In this embodiment, a method will be explained that selects and adds an appropriate wireless LAN compatible input device when it would be like to add a wireless LAN compatible input device in combination with the display device while the display device is in operation.

The management server 11 examines a wireless LAN channel being used by the display device and instructs a wireless LAN compatible input device on standby to temporarily change over to the wireless LAN channel and transmit a wireless LAN frame for measurement. At this time, since the display device need not change the wireless LAN channel which itself uses, the display operation is not interrupted. As with the third embodiment, the management server may specify the radio wave intensity (transmission level) to be output.

Upon receiving the wireless LAN frame for measurement, the display device informs the identifier of the transmitter (e.g., MAC address) and information indicating signal intensity to the management server 11. The management server 11 selects a wireless LAN compatible input device to be added to the display device based on this information using the same method described above.

As described above, this embodiment allows a wireless LAN compatible input device to be added as appropriate even when the display device is in operation.

What is claimed is:
1. A management device comprising:
   a communication unit configured to receive input function information indicating input functions provided by input devices through a wireless network and receive reception level information, from an output device through the wireless network, the reception level information indicating reception levels of signals which the output device connected to the wireless network has received from the input devices through the wireless network;
   a determiner configured to select an input device among the input devices to be combined with the output device based on the input function information and the reception level information; and
   a processing executor configured to receive an input signal transmitted from the input device combined with the output device, and execute processing based on the input signal to obtain processing information, wherein
   the communication unit transmits the processing information to the output device.
2. The management device according to claim 1, wherein the communication unit receives the input function information from the input devices.

3. The management device according to claim 1, wherein the determiner additionally selects an input device to be combined with the output device, having an input function different from that of the input device already combined with the output device.

4. The management device according to claim 1, wherein the determiner selects an input device having a highest reception level out of input devices having same input function.

5. The management device according to claim 1, further comprising:
an instruction signal generating unit configured to generate first instruction signals for instructing input devices which exist on the wireless network to transmit a frame for measurement with a certain transmission level and a second instruction signal for instructing the output device to measure the reception levels of the frames for measurement.

6. The management device according to claim 5, wherein the first instruction signals instruct the input devices to transmit the frame using a predetermined radio channel, and
the second instruction signal instructs the output device to measure the reception levels of the frames using the predetermined radio channel.

7. The management device according to claim 1, wherein
the communication unit receives an input signal which the input device combined with the output device transmits,
the communication unit sends the input signal to an external processing executor,
the communication unit receives from the external processing executor, processing information obtained by executing processing based on the input signal, and
the communication unit transmits the processing information to the output device.

8. The management device according to claim 1, wherein
the determiner selects the input device having an input function necessary for the output device, wherein information on the input function necessary for the output device is previously registered, or an input function informed from the output device.

9. The management device according to claim 1,
wherein the input devices each have an input function but not an output function and a processing function.

10. The management device according to claim 9,
wherein the input devices includes a wireless mouse and/or a wireless keyboard, and the output device is a wireless display device.

11. A device management method comprising:
receiving input function information indicating input functions provided by input devices through a wireless network;
receiving reception level information, from an output device through the wireless network, the reception level information indicating reception levels of signals which the output device connected to the wireless network has received from the input devices through the wireless network;
selecting an input device among the input devices to be combined with the output device based on the input function information and the reception level information;
receiving an input signal from the input device;
executing processing based on the input signal to obtain processing information; and
transmitting the processing information to the output device combined with the input device.

12. The method according to claim 11, wherein the input function information is received from the input devices.

13. The method according to claim 11, further comprising:
additionally selecting an input device to be combined with the output device, having an input function different from that of the input device already combined with the output device.

14. The method according to claim 11, wherein the selecting includes selecting an input device having a highest reception level out of input devices having same input function.

15. The method according to claim 11, further comprising:
transmitting first instruction signals for instructing input devices which exist on the wireless network to transmit a frame for measurement with a certain transmission level; and
transmitting a second instruction signal for instructing the output device to measure the reception levels of the frames for measurement.

16. The method according to claim 15, wherein the first instruction signals instruct the input devices to transmit the frame using a predetermined radio channel, and
the second instruction signal instructs the output device to measure the reception levels of the frames using the predetermined radio channel.

17. A management device comprising a control unit configured to perform the method according to claim 11.

18. The method according to claim 11, wherein
the selecting includes selecting the input device having an input function necessary for the output device, wherein information on the input function necessary for the output device is previously registered, or an input function informed from the output device.

19. The method according to claim 11,
wherein the input devices each have an input function but not an output function and a processing function.

20. The method according to claim 19,
wherein the input devices includes a wireless mouse and/or a wireless keyboard, and the output device is a wireless display device.

21. A non-transitory computer readable medium storing a computer program for causing a computer to execute instructions to perform steps comprising:
receiving input function information indicating input functions provided by input devices through a wireless network;
receiving reception level information, from an output device through the wireless network, the reception level information indicating reception levels of signals which the output device connected to the wireless network has received from the input devices through the wireless network;
selecting an input device among the input devices to be combined with the output device based on the input function information and the reception level information;
receiving an input signal from the input device;
executing processing based on the input signal to obtain processing information; and
transmitting the processing information to the output device combined with the input device.

22. A management device comprising a non-transitory computer-readable medium according to claim 21 and a computer to execute the instructions.

23. The medium according to claim 21, wherein
the selecting includes selecting the input device having an input function necessary for the output device, wherein information on the input function necessary for the output device is previously registered, or an input function informed from the output device.

24. The medium according to claim 21,
wherein the input devices each have an input function but not an output function and a processing function.

25. The medium according to claim 24,
wherein the input devices includes a wireless mouse and/or a wireless keyboard, and the output device is a wireless display device.

* * * * *